United States Patent [19]

Thomé

[11] 4,103,912
[45] Aug. 1, 1978

[54] MOVING SEALING JUNCTION WITH SEALING STRIPS CONTROLLED BY MECHANICAL OPERATORS

[76] Inventor: Paul Thomé, 8 rue Coutureau, 92210 Saint-Cloud, France

[21] Appl. No.: 718,822

[22] Filed: Aug. 30, 1976

[51] Int. Cl.$^2$ .................. B23K 15/00; F16J 15/32
[52] U.S. Cl. .................. 277/226; 228/221; 219/121 EB; 432/242; 277/237 R
[58] Field of Search .................. 228/221, 219, 220, 25; 219/121 EB, 121 EM, 72; 277/3, 1, 226, 237 R; 118/49, 49.1, 49.5, 50, 50.1, 405; 432/242

[56] References Cited

U.S. PATENT DOCUMENTS

| | | | |
|---|---|---|---|
| 844,513 | 2/1907 | Gill | 118/405 X |
| 1,799,375 | 4/1931 | Jones | 432/242 X |
| 2,367,174 | 1/1945 | Renkin | 432/242 X |
| 2,977,106 | 3/1961 | Duff | 432/242 |
| 3,136,883 | 6/1964 | Radtke | 219/121 EB |
| 3,626,142 | 12/1971 | King | 219/72 X |
| 3,855,445 | 12/1974 | Jungle | 219/121 EB |

FOREIGN PATENT DOCUMENTS 37-812  4/1962  Japan ..................... 228/119

Primary Examiner—Robert S. Ward, Jr.
Attorney, Agent, or Firm—Bucknam and Archer

[57] ABSTRACT

The invention relates to a moving sealing device of the type comprising a chamber movable along a pre-determined path along a wall with which it is tightly connected on a closed contour, and means for providing an opening through the wall within said contour and for causing said opening to progress along the pre-determined path of the chamber simultaneously with the latter.

10 Claims, 13 Drawing Figures

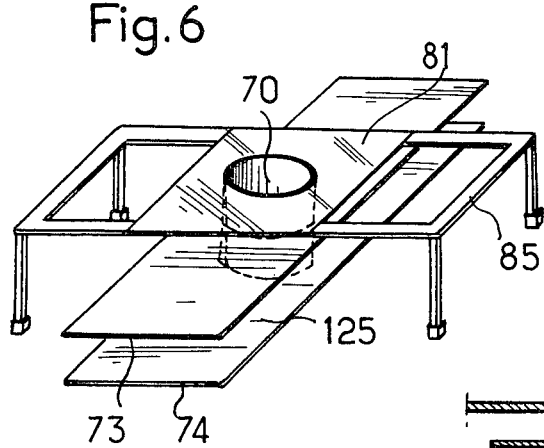
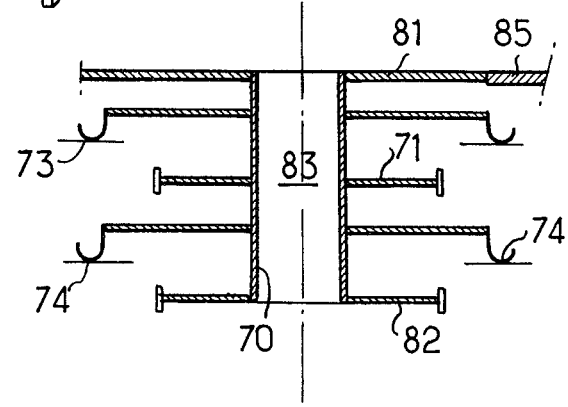
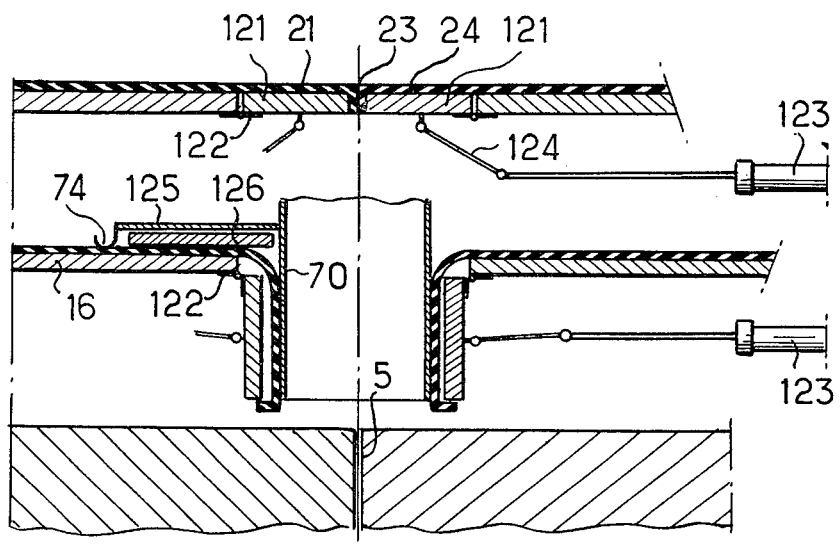

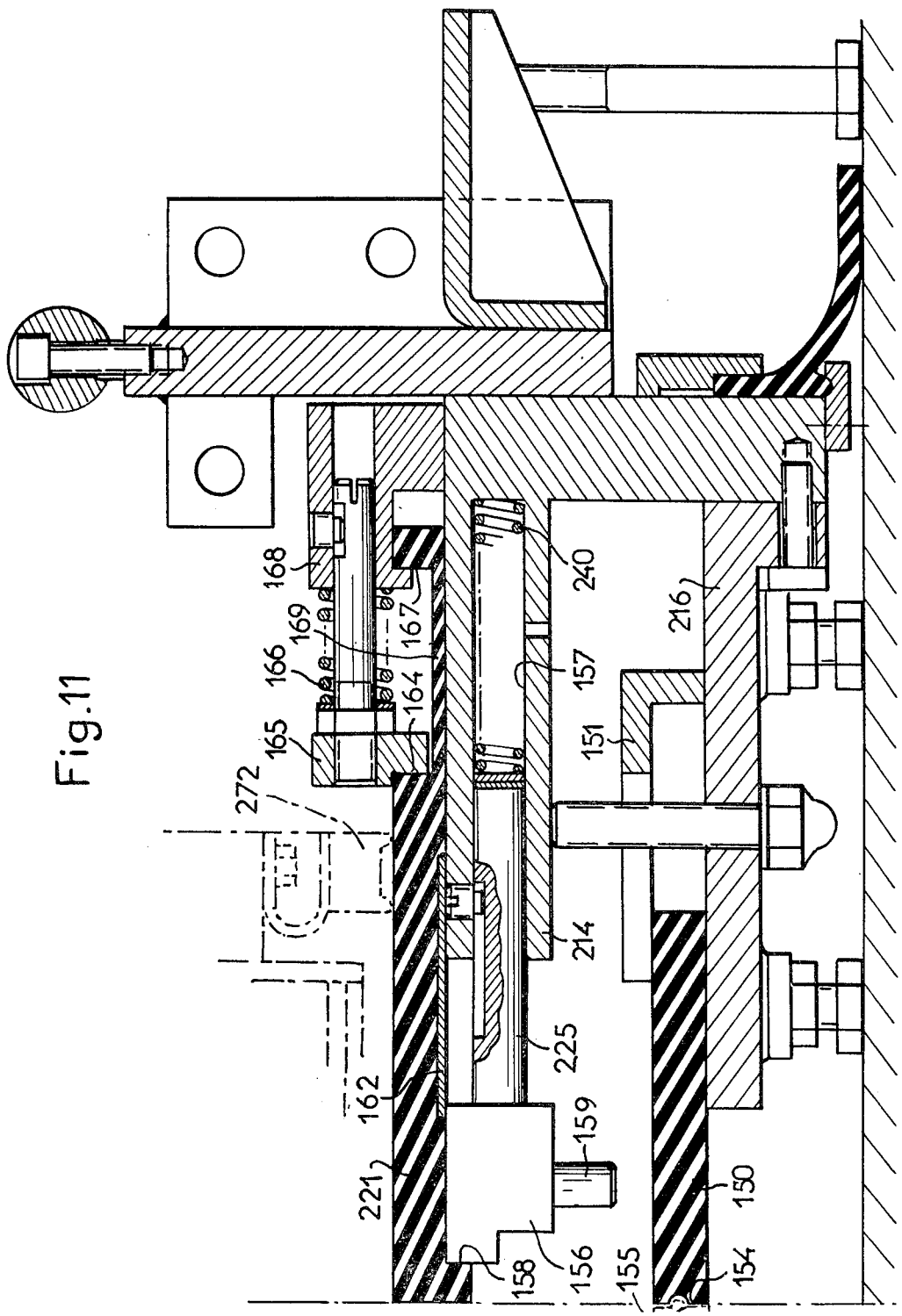

MOVING SEALING JUNCTION WITH SEALING STRIPS CONTROLLED BY MECHANICAL OPERATORS

The present invention relates to a mobile device for effecting junctions under vacuum, so designed as to make it possible to provide tight passages through a partition, or wall, separating two media, said passages being movable on that partition along a pre-determined path without impairing the seal.

More specifically, the object of the invention is a movable sealing device of the type comprising a movable chamber along a predetermined path along a wall with which it is tightly connected following a closed contour, and means for leaving an opening through the wall within said contour and for causing said opening to progress along the pre-determined path of the chamber simultaneously with the latter.

Devices of that type are adapted to be associated, in particular, to a machining apparatus operating in vacuum, e.g., an electron-welding apparatus. The tool, in particular an electron-gun, is then tightly received in the mobile chamber whereas the supporting wall is tightly fixed to the workpieces to be welded, the chamber path corresponding to that of the welding-joint to be made.

In some known devices, the wall is opened by locally disengaging, inside a slide forming the mobile chamber, a metal strip, the function of which, before and after the slide has passed, is to provide the tight closing of a slot made in the wall along the whole path. In some cases, instead of said seal-forming strip, use is made of two similar strips separated from each other by the opening provided in the mobile chamber, one of said strips being wound in said chamber while the other is being unwound, so as to achieve the displacement of the opening.

With such devices already known, it is difficult to obtain the mechanical accuracy (of about one tenth of a millimeter at most) required for maintaining tightness while the slide is passing. This must be ascribed to the necessary flexibility of the metal strip, the latter being always subjected to a slight distortion under pressure and in view of the friction forces associated to the displacement of the slide (mobile chamber). Moreover, the opening of the strip occupies a certain extent, in view of the stiffness of the latter which are supposed to be able, like the remaining wall portions, to withstand the crushing forces due to external pressure. It follows therefrom that the slides should be of relatively large sizes and, accordingly, critical problems are set regarding the strip design.

The invention aims at improving the apparatus of the prior art, by means of novel design capable of ensuring a reliable and reproducible operation and adapted to the time-losses and hazards associated with the formation and maintenance of a sufficient vacuum, during the preparation step and in the course of the welding operation proper. In other words, the invention aims at providing a device having a commercial scope.

To this end, the object of the invention lies in a device of the above described type, characterized in that, in order to close the wall along the mobile chamber path, it comprises at least one row of mechanically resistant members adapted to retract while the chamber is passing, and, at the same time, as least one uninterrupted sealing strip, supported by said members when they are not being retracted, and resiliently flexible so as to form said opening at those places when said members are retracted.

Other features of the invention, relating in particular to the manufacture of the retractable members and of the resilient strips and to their cooperation with the fixed wall and the mobile chamber, will appear from the following description of some specific embodiments, with reference to the accompanying drawings, wherein.

Figure 3:
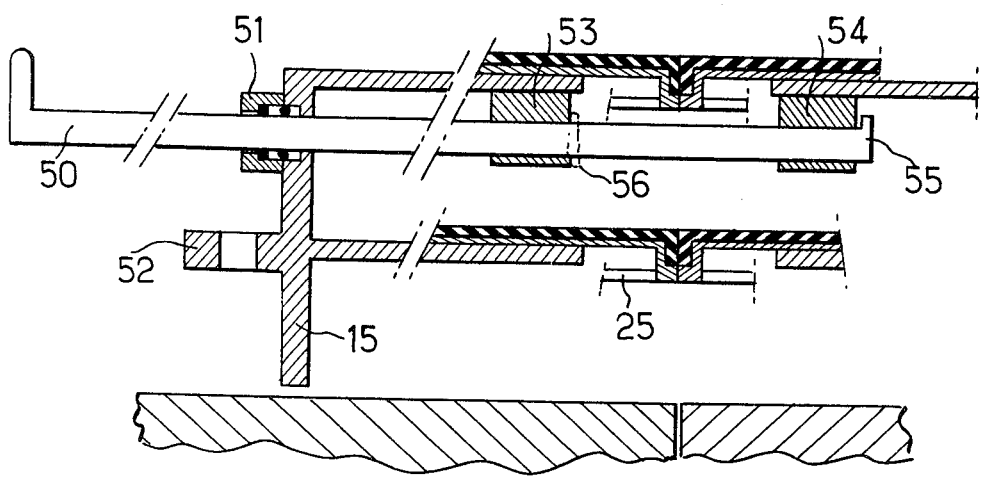
Figure 4:
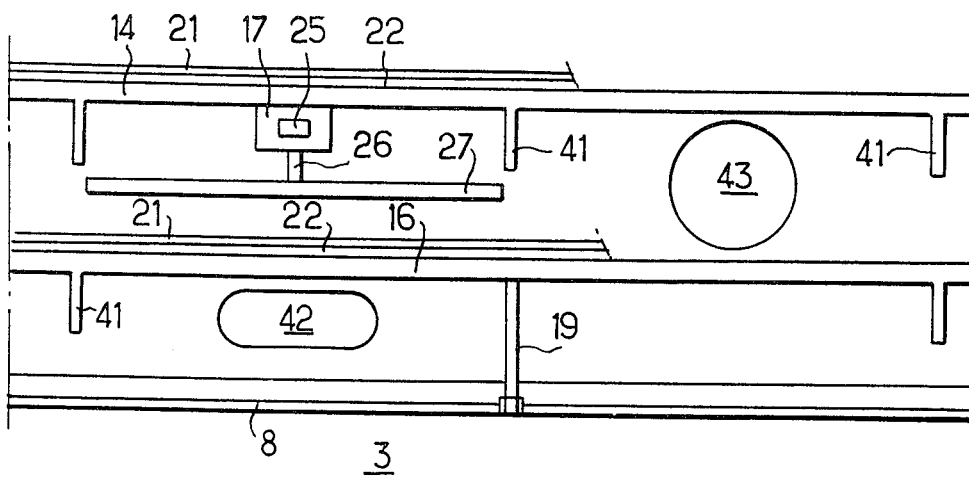

FIGS. 3 and 4 display a few particulars of the device, in cross-section and axial section respectively.

Figure 5:
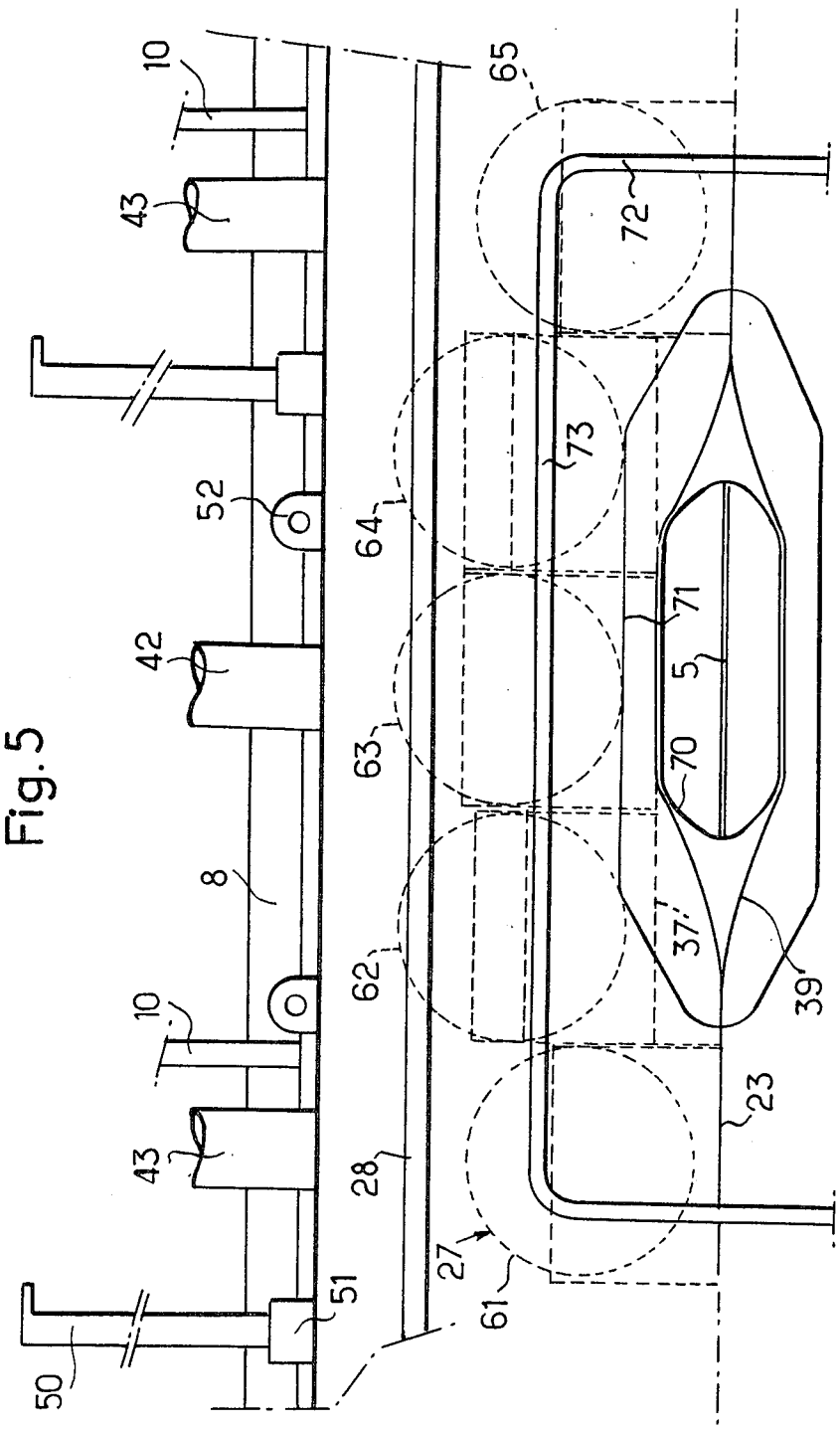

FIG. 5 is a view of the general design of that connecting device comprising two symmetrical half-girders, with the opening and closing of the two strips.

FIG. 6 illustrates the principle of a mobile chamber.

FIG. 7 shows the chamber of FIG. 6 in vertical section.

Figure 8:
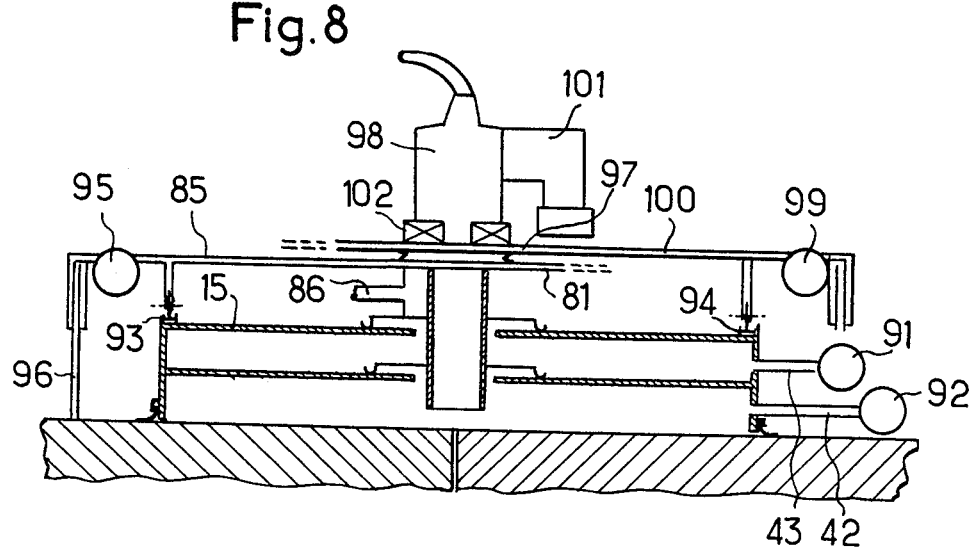

FIG. 8 is a diagrammatic respresentation of a whole device according to the invention, together with the mechanisms for connecting the mobile chamber with the half-girders.

Figure 9:
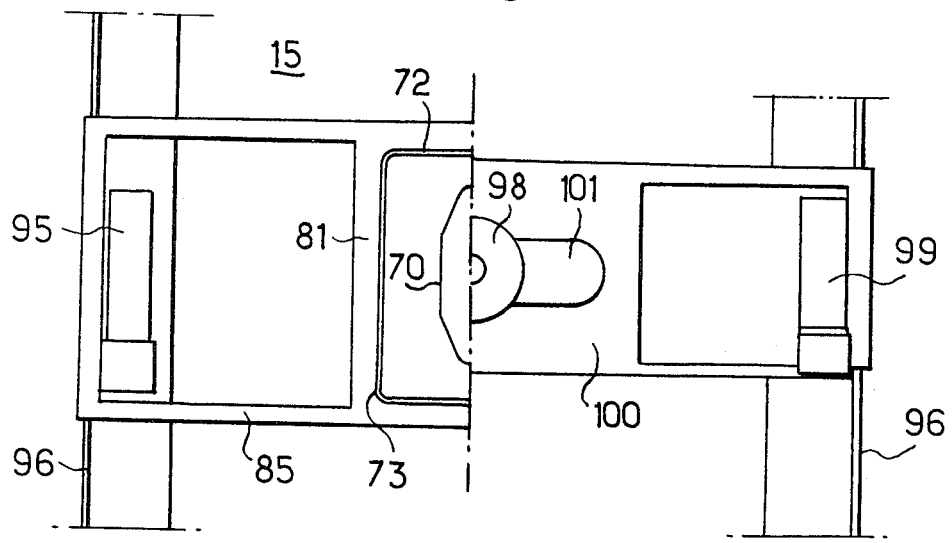

FIG. 9 diagrammatically shows the device of FIG. 8 seen from above.

FIG. 10 diagrammatically illustrates a modified embodiment of the device support members.

FIG. 11 shows another embodiment of the movable seal-forming device according to the invention.

Figure 12:
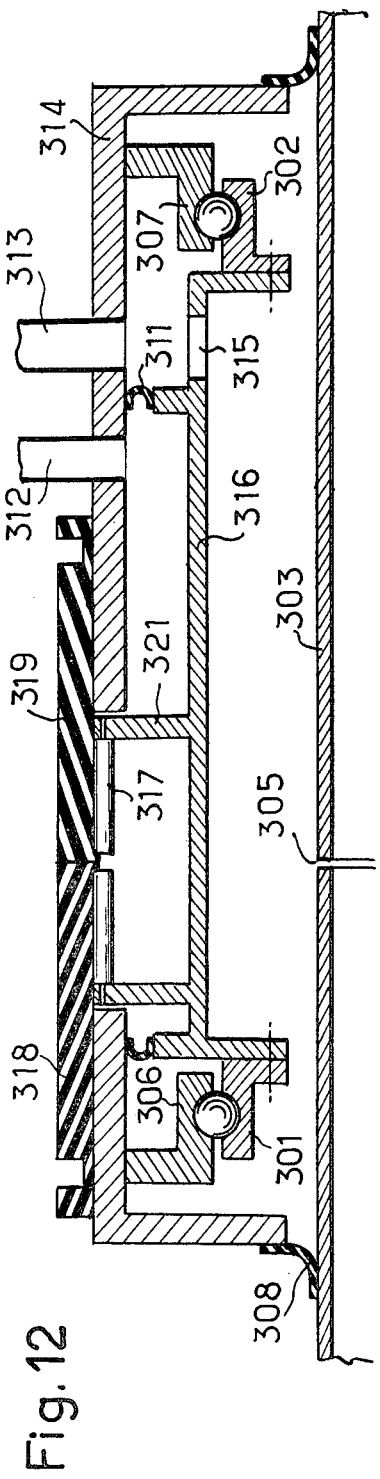

FIG. 12 shows still another embodiment, more especially adapted to form welds around workpieces of the circular section.

Figure 13:
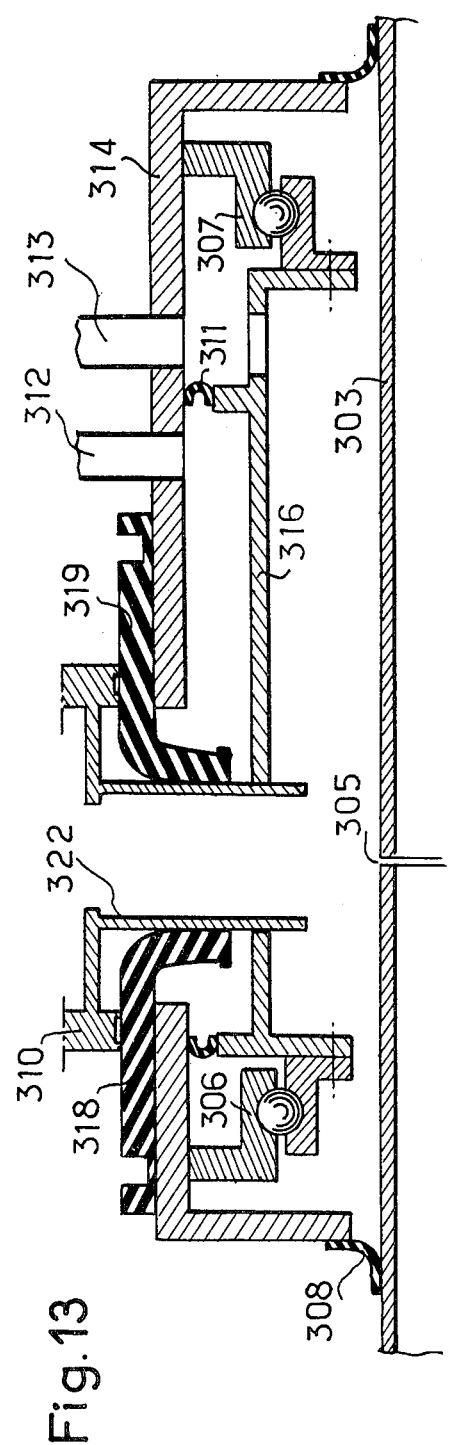

FIG. 13 shows the device in FIG. 12 at its opening.

The device as shown in FIGS. 1 to 9 makes it possible to obtain a mobile vacuum-sealed passage across a wall comprising a girder formed of two half-girders facing each other on both sides of the pre-determined path of a mobile chamber.

Figure 1:
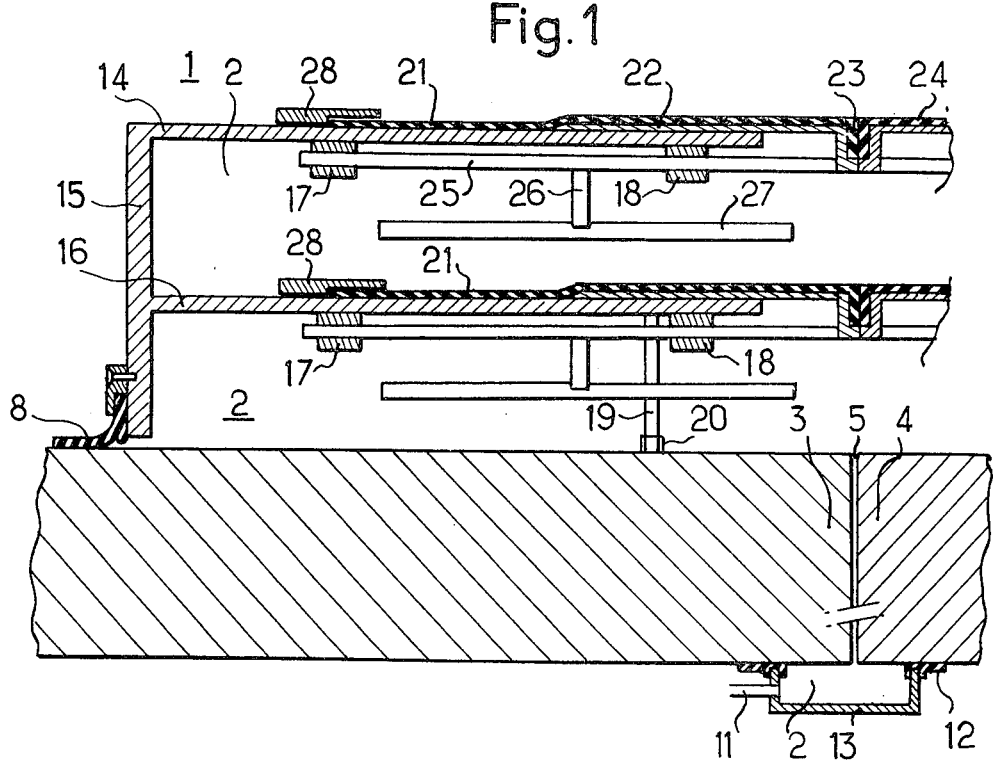
FIG. 1 shows a cross-secton of such a device as is described in the invention, i.e., a tight half-girder with its strips in the closed position.

The chamber slides, following a pre-determined path, along the girder, half of which is visible in FIG. 1. That girder, with two identical stages 14 and 16, separates two media, viz. the ambient atmosphere 1 and the hermetically closed volume 2 defined by girder 15, the chamber (not shown in FIG. 1) and two metal-sheets 3 and 4 which, in the example given, are to be electron-beam welded in vacuum along seam 5. More specifically, tightness is ensured as follows: girder 15, in its upper portion carries flexible strips 21 and 24 which, in their closed position, are pressed against each other, as at 23; at the bottom of the girder, weld joints 8 resiliently rest on sheets 3 and 4, against which they may eventually be clamped by suitable means. On the other side of seam 5 is hermetically mounted a receptacle 13 pumped down by 11 and resting on members 3 and 4 through seals 12.

The girder comprises fixed parts and retractable members, which are mechanically resistant and adapted to bear strips 21 and 24. These retractable members are constituted by small plates, or trays, 22, arranged side by side in two symmetrical rows along the pre-determined path and the movement of which is controlled, in parallel relative to the girder horizontal wall, by the recoil, or backward movement, of rods 25 sliding in guides 17 and 18. Free disks 27 are secured to said rods by means of pins 26. In FIG. 1 are also shown diagrammatically seal-retainers 28 adapted to apply strip 21 tightly against the guides. The latter is carried by lugs 19, adjustable in height at 20, through which mechanical stresses are transferred to sheets 3 and 4 which are to be welded.

Figure 2:
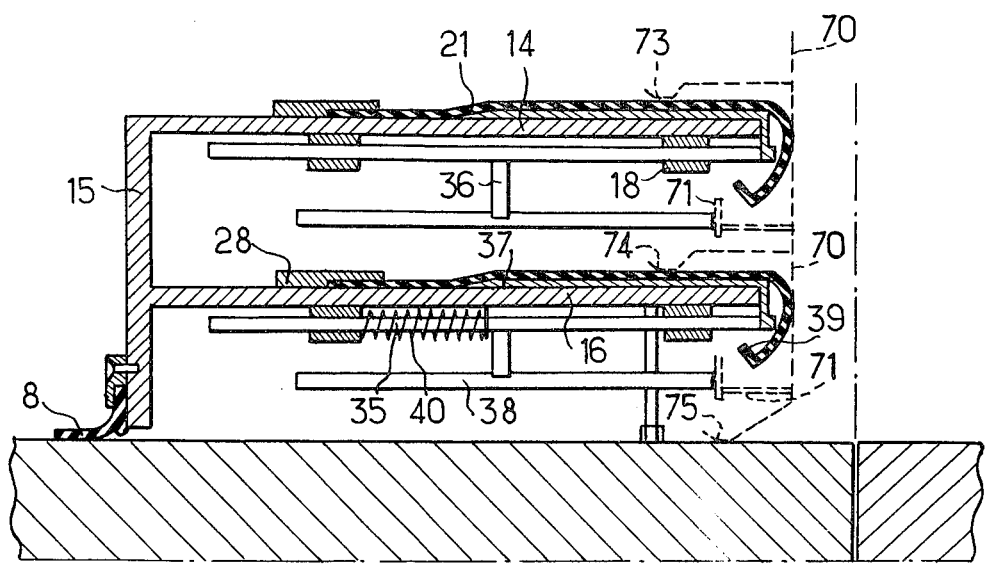
FIG. 2 shows the same half-girder with the strip thereof in the open position.

FIG. 2 shows the same half-girder in the opened position. Plates 22 have been pushed to 37 (FIG. 2) through the retraction of rods 25 (FIG. 1) to 35 (FIG. 2). These plates slide along stages, or levels, 14, 16 respectively, below strips 21. These strips 21 are no longer supported, and since they are made of a resilient substance (e.g., rubber or flexible plastic materials), they can be pushed aside to 39, thus leaving access to seam 5, through an opening movement, directed downwards at right angles to the horizontal surfaces of the girder's two stages, or levels, within the sliding chamber. There are quite a number of means for controlling the receding movements of the retractable plates and the opening movement of the flexible strips. In the example shown, these movements are generated by members 71 and 82 which form part of the chamber and are adapted to drive free disks 38 against the bias of return springs 40.

Diagrammatically shown in broken lines are a few members belonging to the sliding chamber, viz. sealing joints 73 and 74 (and, eventually, 75), adapted to rub against the even upper face of strip 21 of upper level 14, against the strip of medium level 16 and, eventually, against the workpieces to be welded, respectively. These structures are integral with, or attached to, a so-called 'chimney' 70.

Jacks 50 (FIG. 3), passing through a tight passage 51 in the girder, are used for clamping the two half-girders. By sliding in guides 53 fixed to one of said half-girders, they are engaged with guides 54, fixed to the other half-girder and are locked by rotation, by means of an indicator 55. Upon the passage of the sliding chamber, they are retracted at 56, then re-locked. Lugs 52 can also be used for rigidly securing the girder to the workpieces to be welded, by means of conventional tools and vises (not shown).

Levels, or stages, 14 and 16 of the girder are reinforced by means of ribs 41. The stiffness of the girder therefore results from the structures themselves, from adjustable props 19, jacks 50 and, eventually, from other outside means (not shown) adapted to withstand stresses through fixing lugs 52.

In FIG. 4 are shown, in axial section, a mobile rod 25 sliding in a guide 17 and coupled to disk 27 through perpendicular rod 26, as well as pumping ports, or orifices, 42 and 43 designed to evacuate the girder's lower and upper compartments separately, respectively beteen the workpieces to be welded and level 16, and between levels 16 and 14.

FIG. 5 shows pumping ducts 42 and 43 of the girder's two levels, jacks 50 and lugs 52. It also shows seal-retainers 28 designed to ensure the tightness of strip 21 on the associated girder level, the two strips clamped along the edges thereof at 23, and opened at 39 so as to leave access to seam 5 separating sheets 3 and 4, "chimney" 70 pushing apart the two strips, and member 71, the function of which is to push back temporarily the retractable supporting plates by successively displacing disks 27 (viz. 61, 62, 63, 64 and 65); finally, the figure shows the chamber seals 72 and 73, resting on the strips at places which are permanently supported by resistant members (viz., non-retracted support members 22, or member 37 retracted in alignment with the girder fixed portions).

FIGS. 6 and 7 illustrate the principle of a chamber sliding on a wall, such as above described. The chamber comprises a central 'chimney' 70, an upper platen 81 for installing the tools intended to be used (e.g., an electron gun), two plates carrying seals 73 and 74, bearing on the upper (14) and lower (16) levels of the girder covered with strips 21, and two further plates 71 and 82 for mechanically spacing apart the disks connected to retractable plates 37. To platen 81 is fixed a rigid structure 85 adapted to drive the chamber. Assuming one intends placing an electron-gun above 81, it is necessary to evacuate the inner portion 83 of the 'chimney' as thoroughly as possible. It can thus be seen that the first evacuated stage (or sealing ring) of the sliding chamber corresponds to the volume defined by seals 73, 74, viz, to the volume of the girder upper stage, pumped through seal 75. Vacuum in the second stage is ensured by seal 75: it is the volume corresponding to the lower stage of the girder. It is pumped through orifices, or ports, 42 and 11 (the latter is under seal 5). Such a design leads to a substantial decrease in the number and weight of the parts which usually form the sliding chamber.

However, should it be desirable to create a better vacuum inside the 'chimney,' it is possible to raise the latter to provide a pumping port 86 (FIG. 8), to be conncted to a pumping unit, movable with the chamber.

FIGS. 8 and 9 show a general arrangement of the device. In these figures are shown girder 15 with the pumping orifices of the two stages and the associated fixed pumping conduits 91 and 92. Platen 81 of the chamber is connected to a rigid structure 85 which withstands the pressure stresses and rolls along rails 93 and 94 mounted on the girder. This structure is driven by a motor 95 clutched with an auxiliary guide rail 96 which can be fixed to the girder by means of lugs 52 (FIG. 3). Similarly shown is the electron-gun 98 connected to platen 81 of the mobile chamber through a flexible coupling 97. This gun is supported by a rigid structure 100 and is independently driven by its motor 99. These two separate movements are intended to provide a perfectly smooth displacement of the gun, without any chattering resulting from the various friction forces generated by the mobile chamber seals. In that diagram, the sliding chamber is shown provided with an additional pumping orifice 86. Gun 98, its secondary pump 101 and its electro-magnetic lens 102 constitute a rigid unit.

The modified embodiment of FIG. 10 differs from the above described device by the design of the retractable strip supporting members, by the way the movements of said members are controlled and also by improvements adapted to reduce the possible leaks resulting from a transient interruption in the tightness of seals 73 and 74. The girder's upper level, or stage, is shown in the closed position. The supporting members consist of plates 121 adapted to be tilted and to swing under the strips, at the right moment, by pivoting about hinges 122 under the action of jacks 123 comprising an articulated arm 124. The tightening of these jacks by means of electro-magnetic controls serves to press the lips 23 of strips 21 and 24 against each other, thus providing a sealed connection between them. The opened position is shown in the lower level, or stage, of the girder: 'chimney' 70 of the chamber pushes aside strips 21 and 24. Said chimney is connected by annular plate 125 to sliding seal 74; between plate 125 and level 16 is fitted a shim 126, or the like, adapted to act as a filler and to cut off possible leaks.

FIG. 11 shows still another embodiment of the device according to the invention, wherein various parts constitute an improvement over the previous embodiments. Some parts similar to corresponding parts in the previous figures are designated by the same reference numbers increased by 200.

In this embodiment, the two levels (or stages) 214, 216 of girder 215 are not identical. The lower level (216) does not contain separately retractable rigid members. On the other hand, said level is provided, on each side of the pre-determined path of the mobile chamber, with a continuous strip 150, of a resilient material, one edge of which is maintained clamped to level 216 by means of a shim 151, while the other edge thereof extends beyond the girder's rigid portion and can be turned down by cooperating rollers (not shown), carried by the mobile chamber. A sealing joint of said chamber, similar to seal 74 of the previous figures, rests on the upper portion of the strip. The two facing extremities 154 and 155 of the two strips of that level have complementary shapes so that they are interlocked in their closed position.

At the upper level, 214, the girder comprises two rows of mechanically resistant, separately retractable, rigid members, adapted to face each other on both sides of the chamber path, under strips 221. The head 156 of each of said rigid members constitutes a flat upper surface adjoining the surface of the adjacent members, on which rests a portion of the associated strip. Said head is integral with a rod 225 sliding in a horizontal bore 157 of level 214. At the extremity of said bore a spring 240 is provided to push the rigid member to the closed position, so that the head 156 of that member presses upon a specially designed lower flange 158 of strip 221 and applies the edges of the two facing strips against each other. Under head 156, a lug 159 allows a cooperating plate mounted inside the moving chamber to push aside the rigid member against the bias of spring 240, whereas a roller (not shown) deflects the strip edge and thus causes the girder's upper level to open simultaneously with its lower level.

While it is moving, head 156 slides on a metal foil 162 placed under strip 221 and attached to the extremity of level 214. This foil makes a rigid bridge which supports the strip between the girder and the head of the retractable member up to the opening section of the strip.

The upper portion of strip 221 forms an even surface on which rest the mobile chamber joints sliding on the strip. Beyond the lateral seals 272, strip 221, on its upper surface, comprises a recess 164 providing a backing surface for an abutment 165 which, under the bias of a spring 166, pushes the strip in the same direction with the retractable members when the latter are in their closed position so as to complete the function of said members. The distal edge of the strip forms a flange 167 which is maintained hermetically applied against the girder by means of a fixed shim 168. Between said flange 167 and recess 164, portion 169 of the strip is thin enough to be extended under the bias of spring 166.

Quite obviously, the mobile sealing device according to the invention can undergo changes within the scope of the invention. It is to be noted, in particular, that this device can be comprised of one single strip, such as the one in FIG. 11, applied against a fixed portion of the girder, in the closed position. Moreover, the retractable members are not necessarily carried by the same girder portion as the strip, and they can be just as well carried by the opposite portion.

The device according to the invention as shown in FIGS. 12 and 13 constitutes a mobile vacuum-sealing means moving along a circular path about the cross-section of a workpiece. In the example as disclosed, that workpiece is a cylindrical tube 303 on which is made a circular seam-weld at 305.

The two-level girder of the previous embodiments is exchanged for two co-axial chambers 314 and 316 surrounding the tube. The outer chamber 314 is fixed and sealed to tube 303 by means of a resilient joint 308 firmly applied against the tube periphery. Chamber 316 can move in rotation about its axis within the former. It is mounted on two ball-rings, each of which comprises a mobile portion 301, or 302, and a fixed portion 306, or 307, integral with a transverse web adapted to withstand pressure and to support the wall of chamber 316. That inner chamber is integral with sliding chamber 310 which rotates therewith about tube 303. Sliding joints 311 ensure the seals's tightness between mobile inner chamber 316 and fixed outer chamber 314. The outer chamber is evacuated through orifice, or port, 312, while the inner chamber is evacuated through orifice 313, by means of a port 315 in the wall thereof.

As regards the mechanically resistant members of the mobile seal, the individually retractable plates at right angles to the chamber path are replaced, in this new embodiment, by the bars of a kind of squirrel cage, longitudinally driven with respect to the sliding chamber path. FIG. 12 shows such a bar 317, carrying two flexible strips 318, 319, in the closed position thereof. These strips, which face each other on both sides of the joint, provide a sealed closure as in the previous embodiments, but they form an uninterrupted ring around the whole periphery of the device's cylindrical outer chamber. Their longitudinal section is exactly the same as that of strip 221 of FIG. 11. Beyond the secton flexed at the opening of the junction, these strips rest on the outer wall of chamber 314 and they are fixed to the latter by members (not shown) similar to those of FIG. 11. In order to receive the flanges of the two facing strips, bars 317 have a reduced cross-section in their middle portion.

The said bars have their extremities mounted in two webs 321 having the shape of annular segments. They are mounted contiguously so as to provide a substantially uninterrupted support for strips 318 and 319. However, a peripheral portion of the squirrel cage is devoid of bars so as to allow the strips to be flexed open. Webs 321 are integral with mobile inner chamber 316, so that the bars are driven by its rotation at the same time as the sliding chamber 310.

In the opened position, as shown in FIG. 13, the strips are flexed by cooperating members of sliding chamber 310, viz, more exactly, in the example given, by a 'chimney' 322, directly coupled to the electron-gun, which can be preceded and later followed by rollers which promote the gradual flexing or warping of the strips. 'Chimney' 322 connects the sliding chamber with inner chamber 316 through that portion of the squirrel cage which is devoid of bars.

I claim:

1. A movable sealing device of the type comprising a chamber movable along a pre-determined path along a wall with which it is tightly connected on a closed contour, and means for providing an opening through the wall within said contour and for causing said opening to progress along the pre-determined path of the chamber simultaneously with the latter, wherein said device comprises, along the mobile chamber path, at least one row of mechanically resistant members removable from a supporting position to a non-supporting position while the chamber is passing, and at least one uninterrupted sealing strip, at least partly supported by said members when they are in the supporting position, and resiliently deformable for forming said opening at those places where said members are removed.

2. A movable sealing device of the type comprising a chamber movable along a pre-determined path along a wall with which it is tightly connected on a closed contour, said wall comprising two resilient uninterrupted sealing strips with respective distal edges facing each other along said path, supporting means for at least partly supporting at least one of said strips and comprising a row of separate mechanically resistant members removable from a non-retracted position, said strip being supported by said members when they are in the non-retracted position, means to move individually and successively said members into the retracted position and back to the non-retracted position when they are located inside said closed contour, and means to provide an opening through said wall between said strips by resilient deformation of said strip where said members are in the retracted position, whereby sealing joints of the chamber along said closed contour rest on areas of the strips wherein said strips are supported by a fixed part of the wall or by said members, while said opening is formed inside said contour and made to move along said pre-determined path simultaneously with the moving chamber.

3. A device according to claim 2, comprising two stages, each comprising two resilient sealing strips facing each other and delimitating two compartments, and means to evacuate said compartments separately.

4. A device according to claim 2 wherein said members are slidably mounted between said strip and a fixed part of the said wall, transversally to said strip and wherein said chamber is provided with means to automatically control said members.

5. A device according to claim 1, comprising a chamber movable along a circular path around an outer chamber with which it is tightly connected along a closed contour, said wall comprising two distant fixed parts along said circular path, two continuous resilient strips partly supported by said fixed parts and facing each other by respective distal edges along said circular path, and a series of bars or rollers mounted in contiguous successive position axially around part of an inner chamber rotatively mounted in and coaxial with said fixed outer chamber, to partly support said resilient strips around said circular part except on a portion thereof, said portion moving along said circular path as the inner chamber is rotated, and means to provide an opening between said distal edges of said strips by resilient deformation of said strips within said portion of said circular path.

6. A device according to claim 1 wherein said strip has an even upper surface for engaging sliding joints of the chamber and forms, at a distal flexible edge, a flange adapted to be applied against a fixed part of the wall or against a symmetrical strip by said retractable members.

7. A device according to claim 6, wherein said strip comprises on its upper face a recess providing a backing surface for resilient means to press it into the sealing position and comprises a portion of reduced section adapted to be extended by said resilient means.

8. A resilient strip for a device according to claim 2, comprising a first elongated portion having an even upper surface terminated by a distal flexible edge, a lower surface forming a downwards projecting flange along said distal edge, and a second elongated portion of reduced thickness and transversally extendable, between a recess and a flange having opposite backing surfaces for extension means, said backing surfaces extending perpendicularly to said upper surface.

9. A resilient strip for a device according to claim 5, comprising a first elongated portion having an even upper surface terminated by a distal flexible edge, a lower surface forming a downwards projecting flange along said distal edge, and a second elongated portion of reduced thickness and transversally extendable, between a recess and a flange having opposite backing surfaces for extension means, said backing surfaces extending perpendicularly to said upper surface, and wherein said elongated portions extend along a closed loop of circular shape.

10. A strip according to claim 8 comprising a recess formed in said lower surface for receiving a metal foil along said first portion.

* * * * *